(12) United States Patent
Uneura et al.

(10) Patent No.: US 10,024,361 B2
(45) Date of Patent: Jul. 17, 2018

(54) BEARING STRUCTURE AND TURBOCHARGER

(71) Applicant: IHI Corporation, Koto-ku (JP)

(72) Inventors: Yutaka Uneura, Tokyo (JP); Shinichi Kaneda, Tokyo (JP); Hideyuki Kojima, Tokyo (JP); Tomomi Sugiura, Tokyo (JP); Yuichi Daito, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/233,031

(22) Filed: Aug. 10, 2016

(65) Prior Publication Data

US 2016/0348719 A1    Dec. 1, 2016

Related U.S. Application Data

(63) Continuation of application No. PCT/JP2015/068291, filed on Jun. 25, 2015.

(30) Foreign Application Priority Data

Jul. 9, 2014 (JP) .................................. 2014-141172

(51) Int. Cl.
F16C 32/06 (2006.01)
F16C 17/02 (2006.01)
(Continued)

(52) U.S. Cl.
CPC ........ F16C 32/0603 (2013.01); F01D 25/166 (2013.01); F01D 25/168 (2013.01);
(Continued)

(58) Field of Classification Search
CPC ...... F16C 35/02; F16C 35/067; F16C 35/077; F16C 17/02; F16C 2226/74;
(Continued)

(56) References Cited

U.S. PATENT DOCUMENTS 5,025,682 A    6/1991   McCabe et al.
5,964,483 A    10/1999  Long et al.
(Continued)

FOREIGN PATENT DOCUMENTS

CN    101983282 A    3/2011
CN    103080499 A    5/2013
(Continued)

OTHER PUBLICATIONS

International Search Report dated Sep. 8, 2015 in PCT/JP2015/068291, filed on Jun. 25, 2015 ( with English translation).
(Continued)

*Primary Examiner* — Alan B Waits
(74) *Attorney, Agent, or Firm* — Oblon, McClelland, Maier & Neustadt, L.L.P.

(57) ABSTRACT

A bearing structure includes: an outer circumferential groove formed on an outer circumferential surface of a cylindrical portion of a semi-floating metal bearing, and including two opposed surfaces opposed to each other in an axial direction of a shaft and a bottom surface connected to the two opposed surfaces; a radial hole penetrating a wall portion defining the bearing hole so as to communicate with the bearing hole, and facing the outer circumferential groove of the semi-floating metal bearing; a locking member having a body inserted into the radial hole from the outer side of the shaft, wherein at least part of the body is interposed between the two opposed surfaces and fixed to the outer circumferential groove; and an opposed portion provided in the housing, and opposed to the part of the body of the locking member when the locking member is fixed to the outer circumferential groove.

9 Claims, 4 Drawing Sheets

(51) Int. Cl.

| | | |
|---|---|---|
| *F01D 25/16* | (2006.01) | |
| *F02B 39/14* | (2006.01) | |
| *F16C 27/02* | (2006.01) | |
| *F01D 25/18* | (2006.01) | |
| *F16C 17/10* | (2006.01) | |
| *F16C 35/02* | (2006.01) | |

(52) U.S. Cl.
CPC ............ *F01D 25/186* (2013.01); *F02B 39/14* (2013.01); *F16C 17/10* (2013.01); *F16C 27/02* (2013.01); *F05D 2220/40* (2013.01); *F05D 2240/50* (2013.01); *F05D 2260/30* (2013.01); *F16C 35/02* (2013.01); *F16C 2360/24* (2013.01)

(58) Field of Classification Search
CPC .............. F16C 2226/76; F16C 32/0603; F16C 2360/30; F16C 17/10; F16C 27/02; F01D 25/186; F01D 25/16; F01D 25/166; F01D 25/168; F05D 2240/50; F05D 2260/30; F02B 39/14
See application file for complete search history.

(56) References Cited

U.S. PATENT DOCUMENTS

| | | |
|---|---|---|
| 7,856,962 B2 | 12/2010 | Harvey et al. |
| 9,494,049 B2* | 11/2016 | Takahashi ............. F01D 25/166 |
| 2007/0110351 A1 | 5/2007 | Larue |
| 2012/0237149 A1 | 9/2012 | Uesugi |
| 2013/0236336 A1 | 9/2013 | Koerner et al. |

FOREIGN PATENT DOCUMENTS

| | | |
|---|---|---|
| DE | 18 76 302 U | 7/1963 |
| DE | 29 32 248 A1 | 2/1981 |
| JP | 2006-38217 | 2/2006 |
| JP | 2010-127318 | 6/2010 |
| JP | 2010-138757 | 6/2010 |
| JP | 2011-153569 | 8/2011 |
| JP | 2012-193709 | 10/2012 |
| JP | 2012- 237254 A | 12/2012 |
| JP | 2013-19323 A | 1/2013 |
| JP | 2013-79591 A | 5/2013 |
| JP | 2013-541676 | 11/2013 |
| JP | 2014-51939 A | 3/2014 |
| WO | WO 2012/064575 A2 | 5/2012 |

OTHER PUBLICATIONS

Written Opinion dated Sep. 8, 2015 in PCT/JP2015/068291, filed on Jun. 25, 2015.
German Office Action dated Sep. 29, 2017 in Patent Application No. 10 2015 003 152.9 (with English translation).
Japanese Office Action dated Oct. 10, 2017 in Patent Application No. 2016-532870.
Office Action dated May 17, 2018 in corresponding Chinese Application No. 201580036172.7.

\* cited by examiner

BEARING STRUCTURE AND TURBOCHARGER

CROSS REFERENCE TO RELATED APPLICATIONS

This application is a continuation application of International Application No. PCT/JP2015/068291, filed on Jun. 25, 2015, which claims priority to Japanese Patent Application No. 2014-141172, filed on Jul. 9, 2014, the entire contents of which are incorporated by reference herein.

BACKGROUND

1. Technical Field

The present disclosure relates to a bearing structure in which a shaft is supported by a semi-floating metal bearing, and a turbocharger.

2. Description of the Related Art

Conventional turbochargers have a configuration in which a shaft provided with a turbine wheel on one side and a compressor wheel on the other side is rotatably supported by a bearing housing. Such a turbocharger is connected to an engine, so that the turbine wheel is rotated by exhaust gas discharged from the engine, and the compressor wheel is rotated by the rotation of the turbine wheel via the shaft. The turbocharger compresses air in association with the rotation of the compressor wheel to send the air to the engine.

The bearing housing is provided with a bearing hole in which a bearing is arranged. The bearing is provided with an insertion hole into which the shaft is inserted. The inner circumferential surface of the insertion hole is provided with a bearing surface for receiving a radial load. Japanese Patent Application Laid-Open Publication No. 2012-193709 (PTL 1) describes a turbocharger including a bearing of this type, which is a semi-floating metal bearing. The semi-floating metal bearing described in PTL 1 is prevented from moving in an axial direction and a rotating direction of the shaft by a positioning pin inserted into the bearing housing and the semi-floating metal bearing.

SUMMARY

The positioning pin inserted into the bearing housing and the semi-floating metal bearing is fixed by press fit or screw engagement with respect to the bearing housing. The use of the positioning pin requires press fit control during the insertion, which decreases operation efficiency. The screw engagement of the positioning pin threadedly engaged with the bearing housing decreases accuracy of positioning. The use of the positioning pin for fixing the semi-floating metal bearing thus involves a problem of a decrease in operation efficiency and accuracy of positioning.

An object of the present disclosure is to provide a bearing structure that facilitates a process of fixing a semi-floating metal bearing while ensuring accuracy of positioning, and a turbocharger.

An aspect of the present disclosure is a bearing structure in which a semi-floating metal bearing having a cylindrical portion is housed in a bearing hole formed in a housing, and a shaft is rotatably supported by a bearing surface formed on an inner circumferential surface of the cylindrical portion, the bearing structure including: an outer circumferential groove formed on an outer circumferential surface of the cylindrical portion of the semi-floating metal bearing, and including two opposed surfaces opposed to each other in an axial direction of the shaft and a bottom surface connected to the two opposed surfaces; a radial hole penetrating, in a radial direction of the shaft, a wall portion defining the bearing hole of the housing so as to communicate with the bearing hole, and facing the outer circumferential groove of the semi-floating metal bearing housed in the bearing hole; a locking member having a body inserted into the radial hole from an outer side in the radial direction of the shaft, wherein at least part of the body is interposed between the two opposed surfaces and fixed to the outer circumferential groove; and an opposed portion provided in the housing including the bearing hole, and opposed to the part of the body of the locking member in the axial direction of the shaft when the locking member is fixed to the outer circumferential groove.

The part of the body may be located in the radial hole when the locking member is fixed to the outer circumferential groove, and a wall surface defining the radial hole in the housing may serve as the opposed portion.

The radial hole may be provided with a regulation surface vertical to the axial direction of the shaft and opposed to the locking member, so that a rotation of the semi-floating metal bearing is prevented by the bottom surface of the outer circumferential groove, the locking member, and the regulation surface of the radial hole when the semi-floating metal bearing oscillates in a rotation direction of the shaft.

The bottom surface of the outer circumferential groove may have a polygonal cross section vertical to the axial direction of the shaft.

The body may include: a body lower portion located toward the radial hole and opposed to the shaft when the locking member is fixed to the outer circumferential groove; a pair of body side portions extending forward from the body lower portion in an insertion direction in which the body is inserted into the radial hole, and separated from each other in a plane direction vertical to the axial direction of the shaft and a direction orthogonal to the insertion direction; and projections projecting from the body side portions in a direction in which the body side portions come closer to each other, and fitted to the outer circumferential groove ahead of the shaft in the insertion direction.

In the process of fixing the locking member to the outer circumferential groove, the projections may be pressed and spread out by the bottom surface of the outer circumferential groove in a separating direction in which the projections move away from each other, gradually fitted to the outer circumferential groove while the body side portions are elastically deformed, and come closer to each other due to elastic force of the body side portions when the projections reach ahead of the shaft in the insertion direction.

The bottom surface of the outer circumferential groove may include guide portions facing the radial hole and inclined so as to spread out the respective projections in the separating direction when the projections come in contact with the guide portions in the process of fixing the locking member to the outer circumferential groove.

In order to solve the conventional problem, a turbocharger of the present disclosure includes the bearing structure described above.

The present disclosure facilitates a process of fixing the semi-floating metal bearing while ensuring accuracy of positioning.

DESCRIPTION OF THE EMBODIMENTS

Figure 1:
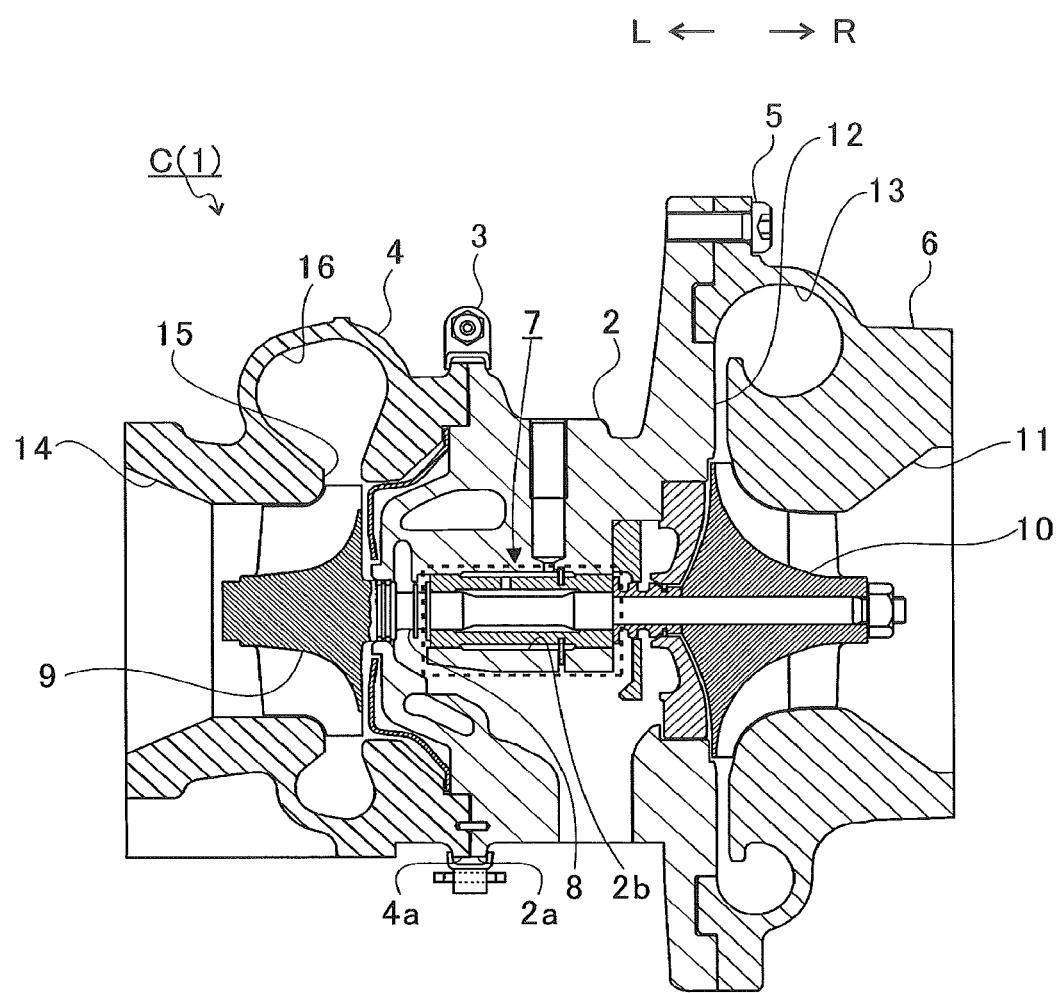
FIG. 1 is a schematic cross-sectional view of a turbocharger according to an embodiment of the present disclosure.

A first embodiment of the present disclosure is described below with reference to the appended drawings. The following dimensions, materials, and specific numerical values described in the embodiment are shown for illustration purposes only, and the present disclosure is not limited thereto. The elements having the same functions and configurations shown in the specification and drawings are designated by the same reference numerals, and overlapped explanations are not repeated below. The elements described below but not related directly to the present disclosure are not shown in the drawings.

FIG. 1 is a schematic cross-sectional view of a turbocharger C. Note that a direction indicated by arrow L shown in FIG. 1 denotes the left of the turbocharger C, and a direction indicated by arrow R denotes the right of the turbocharger C. As shown in FIG. 1, the turbocharger C includes a turbocharger body 1. The turbocharger body 1 includes a bearing housing 2, a turbine housing 4 connected to the left of the bearing housing 2 via a fastening mechanism 3, and a compressor housing 6 connected to the right of the bearing housing 2 via a fastening bolt 5. These elements are integrated together.

An outer circumferential surface of the bearing housing 2 adjacent to the turbine housing 4 is provided with a projection 2a. The projection 2a projects in a radial direction of the bearing housing 2. An outer circumferential surface of the turbine housing 4 adjacent to the bearing housing 2 is provided with a projection 4a. The projection 4a projects in a radial direction of the turbine housing 4. The bearing housing 2 and the turbine housing 4 are fixed together such that the projections 2a and 4a are fastened by band fastening with the fastening mechanism 3. The fastening mechanism 3 includes a fastening band (such as G coupling) for holding the projections 2a and 4a.

The bearing housing 2 has a bearing structure 7. In particular, the bearing housing 2 is provided with a bearing hole 2b penetrating in the right-left direction of the turbocharger C (in an axial direction of a shaft 8) The shaft 8 is rotatably supported in the bearing hole 2b. The bearing structure 7 will be described in detail below.

A turbine wheel 9 is integrally fixed to the left end of the shaft 8. The turbine wheel 9 is rotatably housed in the turbine housing 4. A compressor wheel 10 is integrally fixed to the right end of the shaft 8. The compressor wheel 10 is rotatably housed in the compressor housing 6.

The compressor housing 6 includes an air inlet 11. The air inlet 11 is open on the right of the turbocharger C and is connected to an air cleaner (not shown). The respective opposed surfaces of the bearing housing 2 and the compressor housing 6, which are coupled via the fastening bolt 5, form a diffuser passage 12 through which air is compressed. The diffuser passage 12 has a ring shape extending from the inside to the outside in the radial direction of the shaft 8. The diffuser passage 12 communicates, on the inside in the radial direction, with the air inlet 11 through the compressor wheel 10.

The compressor housing 6 is also provided with a compressor scroll passage 13. The compressor scroll passage 13 has a ring shape and is located on the outside of the diffuser passage 12 in the radial direction of the shaft 8 (the compressor wheel 10). The compressor scroll passage 13 communicates with an air inlet (not shown) of the engine. The compressor scroll passage 13 also communicates with the diffuser passage 12. Once the compressor wheel 10 rotates, air is introduced into the compressor housing 6 from the air inlet 11 and accelerated by centrifugal force while passing through blades of the compressor wheel 10, so as to be compressed in the diffuser passage 12 and the compressor scroll passage 13 and introduced into the air inlet of the engine.

The turbine housing 4 includes an air outlet 14. The air outlet 14 is open on the left of the turbocharger C and is connected to an exhaust gas purifying device (not shown). The turbine housing 4 is provided with a passage 15, and a ring-shaped turbine scroll passage 16 located on the outside of the passage 15 in the radial direction of the shaft 8 (the turbine wheel 9). The turbine scroll passage 16 communicates with a gas flow inlet (not shown) into which exhaust gas discharged from an exhaust manifold (not shown) of the engine is introduced. The turbine scroll passage 16 also communicates with the passage 15. The exhaust gas is introduced into the turbine scroll passage 16 from the gas flow inlet and further introduced into the air outlet 14 through the passage 15 and the turbine wheel 9. The exhaust gas having passed rotates the turbine wheel 9. The rotation force of the turbine wheel 9 is transmitted to the compressor wheel 10 through the shaft 8, so as to rotate the compressor wheel 10. The air is compressed by the rotation force of the compressor wheel 10 and introduced into the air inlet of the engine.

Figure 2:
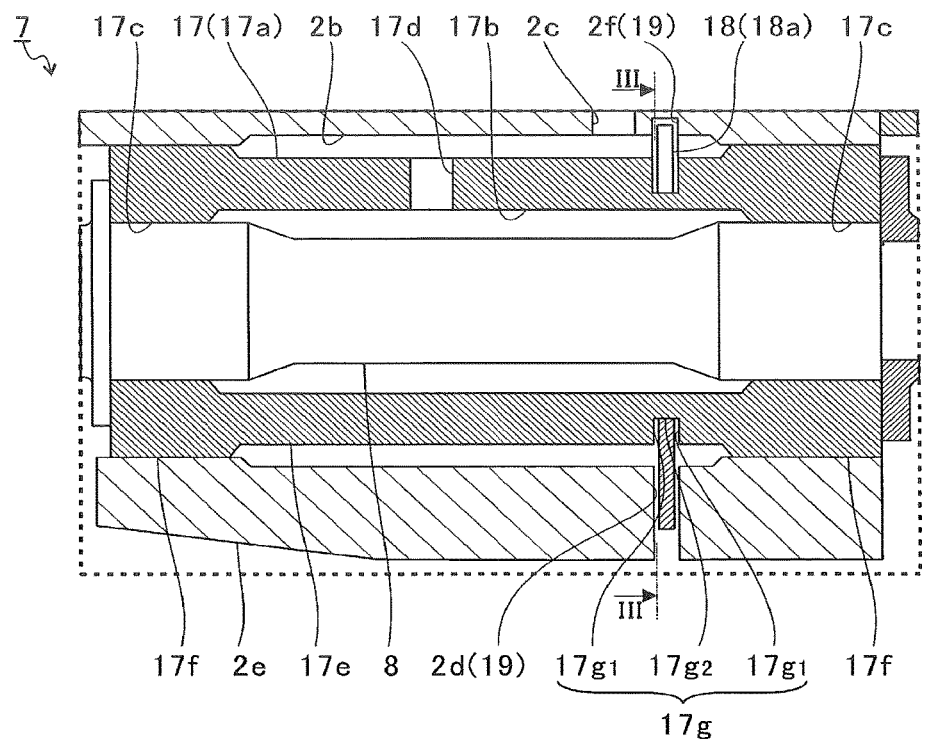
FIG. 2 is a view for describing a bearing structure of the embodiment.

FIG. 2 is a view for describing the bearing structure 7 of the present embodiment, and shows the area surrounded by the broken line in FIG. 1. As shown in FIG. 2, the bearing structure 7 includes the bearing hole 2b formed in the bearing housing 2, and a semi-floating metal bearing 17 housed in the bearing hole 2b. The semi-floating metal bearing 17 includes a cylindrical portion 17a.

An inner circumferential surface 17b of the cylindrical portion 17a includes bearing surfaces 17c on the turbine wheel 9 side (on the left in FIG. 2) and on the compressor wheel 10 side (on the right in FIG. 2).

An oil hole 17d is open on the inner circumferential surface 17b of the cylindrical portion 17a and located between the respective bearing surfaces 17c, and penetrates the cylindrical portion 17a in the radial direction. An oil passage 2c is open to the bearing hole 2b. The oil passage 2c communicates with the outside of the bearing housing 2 and the bearing hole 2b so as to introduce lubrication oil into the bearing hole 2b from the outside of the bearing housing 2. Some of the lubrication oil flows into the bearing hole 2b through the oil passage 2c, and introduced to the inside of the cylindrical portion 17a through the oil hole 17d, so as to be supplied to the bearing surfaces 17c. The semi-floating metal bearing 17 supports the shaft 8 by oil coating pressure of the lubrication oil supplied to the bearing surfaces 17c.

Some of the lubrication oil flowing into the bearing hole 2b through the oil passage 2c is supplied to a gap between the bearing hole 2b and circular projections 17f formed on both sides of an outer circumferential surface 17e of the cylindrical portion 17a in the axial direction of the shaft 8. The supplied lubrication oil functions as an oil damper for damping oscillation.

The outer circumferential surface 17e of the cylindrical portion 17a is provided with an outer circumferential groove 17g. The outer circumferential groove 17g includes two opposed surfaces $17g_1$ opposed to each other in the axial direction of the shaft 8, and a bottom surface $17g_2$ connected to the two opposed surfaces $17g_1$.

The bearing housing 2 is provided with a radial hole 2d. The radial hole 2d is opposed to and located on the outside of the outer circumferential groove 17g in the radial direction of the shaft 8. The radial hole 2d is provided immediately below the bearing hole 2b (on the lower side in FIG. 2) and penetrates a wall portion 2e defining the bearing hole 2b of the bearing housing 2 in the radial direction of the shaft 8 so as to communicate with the bearing hole 2b. The radial hole 2d may have any shape in cross section at any positions in a direction parallel to the axial direction of the shaft 8, as long as the shape conforms to a locking member 18 described below.

The locking member 18 includes a body 18a inserted into the radial hole 2d from the outside in the radial direction of the shaft 8. The body 18a is placed between the two opposed surfaces $17g_1$ of the outer circumferential groove 17g.

Figure 3:
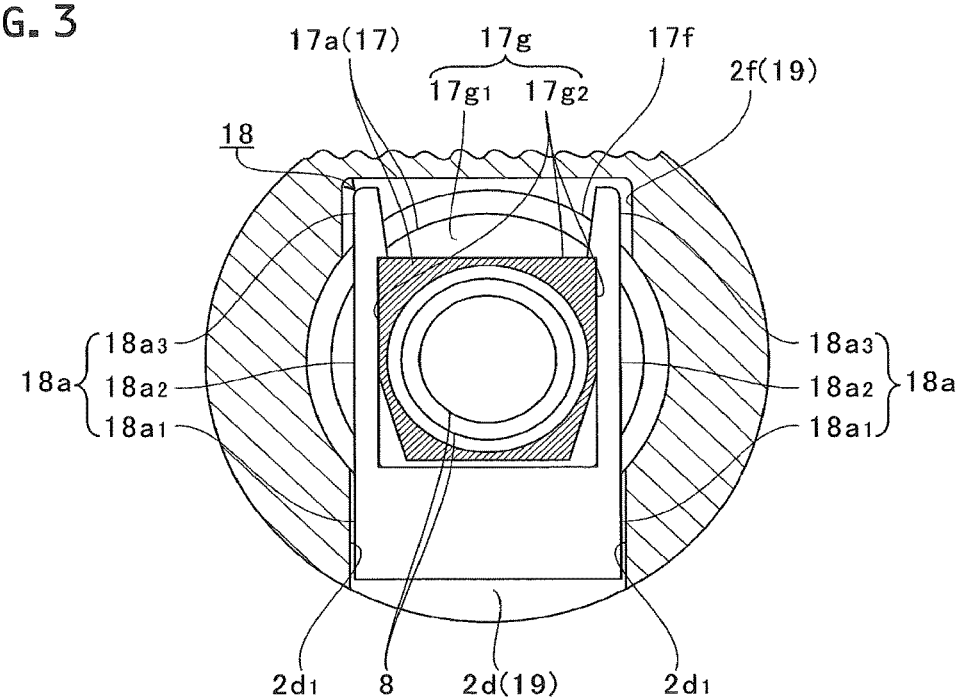
FIG. 3 is a cross-sectional view taken along line of FIG. 2

FIG. 3 is a cross-sectional view taken along line in FIG. 2. As shown in FIG. 3, the body 18a of the locking member 18 includes a body lower portion $18a_1$ located on the lower side (in FIG. 3), and a pair of body side portions $18a_2$ extending upward (in FIG. 3) from the body lower portion $18a_1$.

The body lower portion $18a_1$ is placed on the radial hole 2d side and opposed to the shaft 8 when the locking member 18 is fixed to the outer circumferential groove 17g. The body lower portion $18a_1$ is fitted to part of the outer circumferential groove 17g immediately below the shaft 8 (on the lower side in FIG. 3).

The pair of body side portions $18a_2$ extends forward (upward in FIG. 3) from the body lower portion $18a_1$ in an insertion direction in which the body 18a is inserted into the radial hole 2d (hereinafter, simply referred to as "insertion direction"). The paired body side portions $18a_2$ are separated from each other in a plane direction vertical to the axial direction of the shaft 8 (a direction parallel to a surface vertical to the axial direction of the shaft 8) and a direction orthogonal to the insertion direction. The paired body side portions $18a_2$ are fitted on both sides of the outer circumferential groove 17g (on the right and left sides in FIG. 3) with the shaft 8 interposed therebetween.

The body side portions $18a_2$ are provided with projections $18a_3$ on the tip side thereof. The projections $18a_3$ project from the tips of the body side portions $18a_2$ in a direction in which the body side portions $18a_2$ come closer to each other. The projections $18a_3$ are fitted to the outer circumferential groove 17g ahead of the shaft 8 in the insertion direction. Namely, the projections $18a_3$ are fitted to the outer circumferential groove 17g immediately above the shaft 8. The locking member 18 is fixed to the outer circumferential groove 17g accordingly.

The body lower portion $18a_1$ is located toward the radial hole 2d when the projections $18a_3$ are fixed to the outer circumferential groove 17g. A wall surface defining the radial hole 2d in the bearing housing 2 serves as an opposed portion 19.

The opposed portion 19 is opposed to part of the body 18a (the body lower portion $18a_1$) of the locking member 18 in the axial direction of the shaft 8 when the locking member 18 is fixed to the outer circumferential groove 17g. As shown in FIG. 2, the opposed portion 19 is opposed to the body 18a in the axial direction of the shaft 8, and the opposed surfaces $17g_1$ of the outer circumferential groove 17g are also opposed to the body 18a in the axial direction of the shaft 8. Accordingly, the semi-floating metal bearing 17 is prevented from moving in the axial direction of the shaft 8.

As shown in FIG. 2 and FIG. 3, the bearing hole 2b is provided with an inner circumferential groove 2f at the same position as the radial hole 2d in the axial direction of the shaft 8. The inner circumferential groove 2f is provided on the inner surface of the bearing hole 2b. The inner circumferential groove 2f is located at the same position as the radial hole 2d in the axial direction of the shaft 8. The upper tip portions of the projections $18a_3$ enter the inner circumferential groove 2f, as shown in FIG. 2 and FIG. 3. As in the case of the radial hole 2d, a wall surface defining the inner circumferential groove 2f of the bearing housing 2 is opposed to the tip portions of the projections $18a_3$ in the axial direction of the shaft 8, and serves as the opposed portion 19.

As shown in FIG. 2, the locking member 18 is prevented from moving in the axial direction of the shaft 8 due to the opposed portions 19 formed on the upper and lower sides with the shaft 8 interposed therebetween. Therefore, load acting on the locking member 18 is dispersed, so that the durability is improved, as compared with a case in which the opposed portion 19 formed only on one side prevents the movement of the locking member 18.

As shown in FIG. 3, the bottom surface $17g_2$ of the outer circumferential groove 17g is formed such that the cross-sectional shape of the cylindrical portion 17a vertical to the axial direction of the shaft 8 is a polygon (hexagon in this case). That is, the cylindrical portion 17a has a polygonal cross section vertical to the axial direction of the shaft 8 and defined by the bottom surface $17g_2$. The radial hole 2d is provided with regulation surfaces $2d_1$. The regulation surfaces $2d_1$ are opposed to the locking member 18 in the direction orthogonal to the axial direction of the shaft 8. When the semi-floating metal bearing 17 oscillates in the rotating direction of the shaft 8, the semi-floating metal bearing 17 is prevented from rotating by the bottom surface $17g_2$ of the outer circumferential groove 17g, the locking member 18, and the regulation surfaces $2d_1$ of the radial hole 2d.

More particularly, when the semi-floating metal bearing 17 oscillates in the rotating direction of the shaft 8, the outer circumferential groove 17g pushes the locking member 18, so that the locking member 18 oscillates together with the semi-floating metal bearing 17. The regulation surfaces $2d_1$ then come into contact with the locking member 18, so as to prevent further oscillation (rotation) of the locking member 18 and the semi-floating metal bearing 17.

Figure 4A:
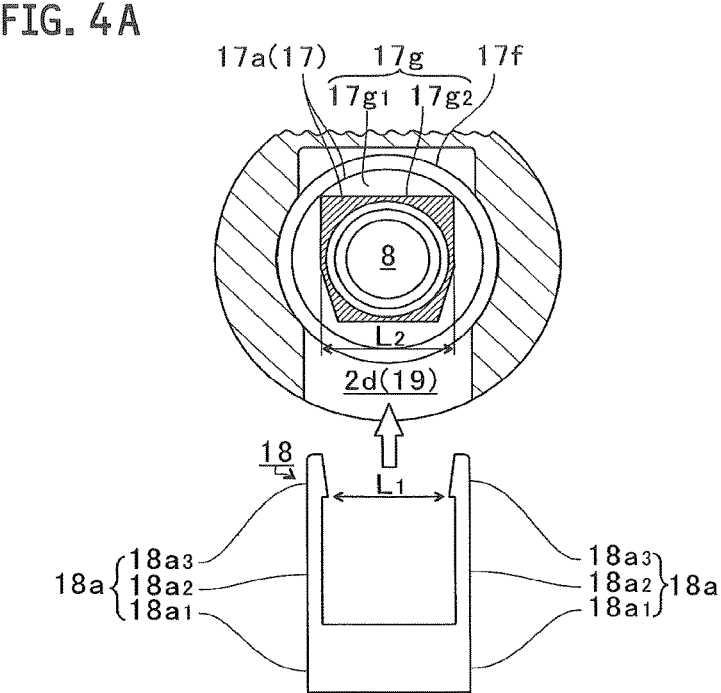
FIG. 4A to FIG. 4C are views for describing a process of fixing a locking member according to the first embodiment of the present disclosure.
Figure 4B:
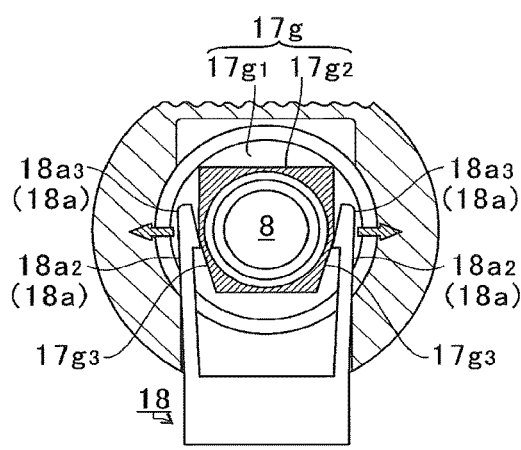
Figure 4C:
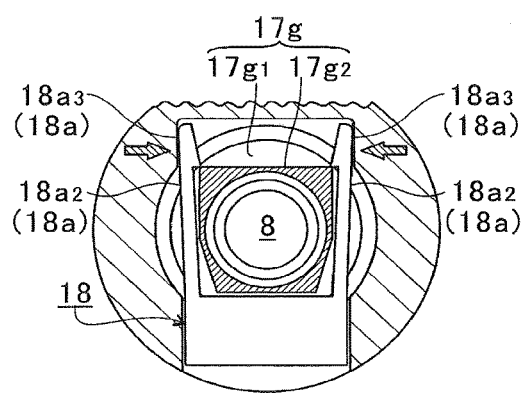

FIG. 4A to FIG. 4C are views for describing a process of fixing the locking member 18. FIG. 4A is the same cross-sectional view as FIG. 3, and shows a state before fixing the locking member 18. FIG. 4B and FIG. 4C are the same cross-sectional views as FIG. 3, and show the process of fixing the locking member 18.

As shown in FIG. 4A, distance L1 between the respective projections $18a_3$ provided on the tip side of the body side portions $18a_2$ is smaller than width L2 of the outer circumferential groove 17g in the plane direction vertical to the shaft 8.

In the process of fixing the locking member 18 to the outer circumferential groove 17g, when the locking member 18 is inserted into the radial hole 2d from the lower side to the upper side, as indicated by the solid-white arrow shown in FIG. 4A, the respective projections $18a_3$ are pressed and spread out in the separating direction by the bottom surface $17g_2$ of the outer circumferential groove 17g, as shown in FIG. 4B. The paired body side portions $18a_2$ are elastically deformed in the separating direction (indicated by the hatched arrows shown in FIG. 4B). The locking member 18 is gradually fitted to the outer circumferential groove 17g while the body side portions $18a_2$ are elastically deformed.

The outer circumferential groove 17g is provided with guide portions $17g_3$ on both sides thereof with the shaft 8 interposed therebetween. The guide portions $17g_3$ are formed on the bottom surface $17g_2$ of the outer circumferential groove 17g opposed to the radial hole 2d, and located at portions where the respective projections $18a_3$ come into contact when the locking member 18 is being fixed to the outer circumferential groove 17g. The guide portions $17g_3$ are inclined so as to spread out the respective projections $18a_3$ in the separating direction. In other words, the respective guide portions $17g_3$ are inclined upward to gradually separate from each other.

As shown in FIG. 4C, once the projections $18a_3$ reach ahead of the shaft 8 (upward) in the insertion direction, the respective projections $18a_3$ come closer to each other due to the elastic force of the body side portions $18a_2$ in the direction indicated by the hatched arrows shown in FIG. 4C, so that the locking member 18 is fixed to the outer circumferential groove 17g.

Conventionally, a positioning pin for positioning a semi-floating metal bearing is inserted into a bearing housing and the semi-floating metal bearing. However, the use of a positioning pin requires high accuracy at the time of press fit control and pin positioning, which leads to a decrease in operation performance.

The present embodiment facilitates the process of fixing the semi-floating metal bearing 17 due to a simple operation of inserting the locking member 18 into the radial hole 2d so as to easily fix the locking member 18 to the outer circumferential groove 17g of the cylindrical portion 17a of the semi-floating metal bearing 17.

The use of a positioning pin also requires high accuracy of positioning not only in the axial direction of the shaft 8 but also in the plane direction vertical to the shaft 8. However, the locking member 18 is only required to ensure accuracy of positioning in the axial direction of the shaft 8, whereas it is not necessary to ensure strict positioning in the plane direction vertical to the shaft 8.

Further, a positioning pin used for preventing movement of a semi-floating metal bearing may increase a local load when the positioning pin comes in line contact with an inner wall of a hole into which the positioning pin is inserted. The locking member 18 of the present embodiment, however, comes in surface contact with the opposed surfaces $17g_1$ of the outer circumferential groove 17g and the opposed portions 19, so as to disperse the load acting on the locking member 18 and thus increase the durability.

Figure 5A:
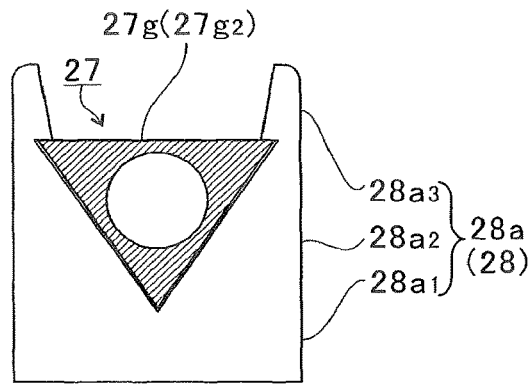
FIG. 5A to FIG. 5C are views for describing second to fourth embodiments of the present disclosure.
Figure 5B:
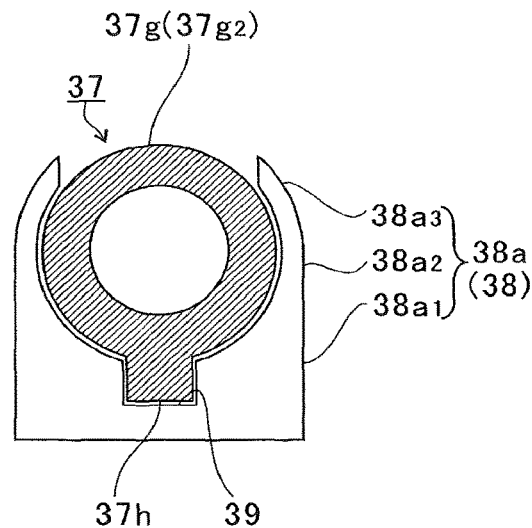
Figure 5C:
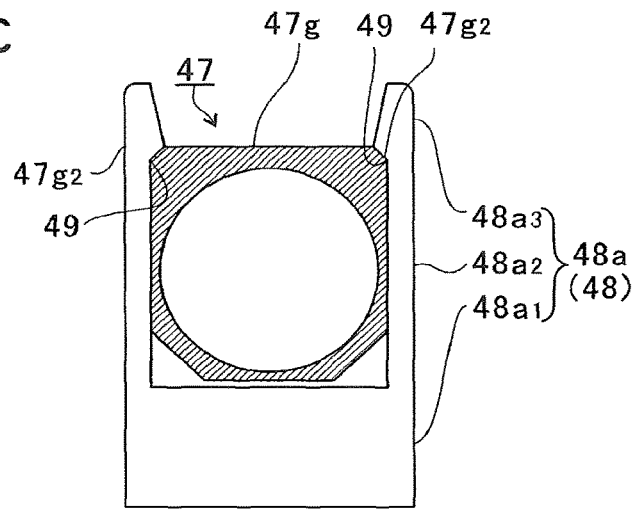

FIG. 5A to FIG. 5C are cross-sectional views each corresponding to FIG. 3, for describing other embodiments of the present disclosure. FIG. 5A to FIG. 5C each only show a cross section of an outer circumferential groove of a semi-floating metal bearing and a locking member for clarity and brevity. The other configurations are the same as those in the first embodiment, and explanations thereof are omitted below.

FIG. 5A shows a semi-floating metal bearing 27 and a locking member 28 of the second embodiment. An outer circumferential groove 27g of the semi-floating metal bearing 27 includes a bottom surface $27g_2$. The bottom surface $27g_2$ of the outer circumferential groove 27g has a triangular cross section vertical to the axial direction of the shaft 8. The cross section of the cylindrical portion 17a vertical to the axial direction of the shaft 8 and defined by the bottom surface $27g_2$, is a triangle in this embodiment. The cross-sectional shape of the bottom surface $27g_2$ of the outer circumferential groove 27g is thus not limited to the hexagon but may be any polygonal shape that has three or more angles. A body lower portion $28a_1$, body side portions $28a_2$, and projections $28a_3$ of a body 28a of the locking member 28 are each formed so as to conform to the bottom surface $27g_2$ of the outer circumferential groove 27g.

FIG. 5B shows a semi-floating metal bearing 37 and a locking member 38 of the third embodiment. An outer circumferential groove 37g of the semi-floating metal bearing 37 has a substantially circular cross section vertical to the axial direction of the shaft 8. A bottom surface $37g_2$ of the outer circumferential groove 37g is provided with a bottom projection 37h projecting in the radial direction of the shaft 8. The locking member 38 includes a pair of body side portions $38a_2$, as in the case of the first and second embodiments. The body side portions $38a_2$ on the outer circumferential groove 37g side each have a curved surface. The body side portions $38a_2$ are provided at tip portions with projections $38a_3$ projecting along the curved surfaces so as to come closer to each other. A body lower portion $38a_1$ includes a recess 39 located to face the bottom projection 37h. The recess 39 is formed to conform to the bottom projection 37h in the projecting direction. The bottom projection 37h is fitted to the recess 39, so as to prevent the rotation of the semi-floating metal bearing 37.

The cross-sectional shape of the bottom surface $37g_2$ of the outer circumferential groove 37g vertical to the axial direction of the shaft 8 is not limited to a polygonal shape. When the cross section has a shape other than a polygon, the rotation of the semi-floating metal bearing 37 is prevented by the bottom projection 37 and the recess 39. Although the present embodiment exemplifies the case in which the projection is provided on the semi-floating metal bearing 37, and the recess is provided on the locking member 38, the recess may be provided on the semi-floating metal bearing 37, and the projection may be provided on the locking member 38.

However, a polygonal cross section, such as the bottom surface $27g_2$ of the outer circumferential groove 27g of the second embodiment, increases processability as compared with a case in which the bottom surface $27g_2$ is provided with a projection, and easily ensures a configuration to prevent the rotation of the floating metal 27.

FIG. 5C shows a semi-floating metal bearing 47 and a locking member 48 of the fourth embodiment. A body 48a of the locking member 48 of the fourth embodiment includes a body lower portion $48a_1$, body side portions $48a_2$, and projections $48a_3$ having substantially the same configurations as those in the embodiment described above. While the body side portions $18a_2$ and the projections $18a_3$ of the above-described embodiment are connected at a substantially right angle at bent portions on the outer circumferential groove 17g side, a bent portion 49 of the fourth embodiment is formed at an obtuse angle. A bottom surface $47g_2$ of an outer circumferential groove 47g is bent at portions facing the bent portions 49 to have substantially the same angle as the bent portions 49.

The angle at the respective bent portions 49 is thus not limited to a right angle but may be an acute or obtuse angle.

The bottom surface $47g_2$ of the outer circumferential groove $47g$ is formed to conform to the bent portions 49 so as to fix the projections $48a_3$ to the outer circumferential groove $47g$.

Although the wall surfaces of the radial hole $2d$ and the inner circumferential groove $2f$ serve as the opposed portions 19 in the respective embodiments, the wall surface of either the radial hole $2d$ or the inner circumferential groove $2f$ may serve as the opposed portion 19.

The inner circumferential groove $2f$ formed in the bearing hole $2b$ in the respective embodiments may be omitted when the wall surface of the radial hole $2d$ serves as the opposed portion 19. The use of the wall surface of the radial hole $2d$ as the opposed portion 19 simplifies the process of providing the opposed portion 19.

The respective embodiments exemplified the case in which the regulation surfaces $2d_1$ are formed in the radial hole $2d$ so as to prevent the semi-floating metal bearings 17, 27, 37, and 47 from moving in the rotation direction. The semi-floating metal bearings 17, 27, 37, and 47 may be prevented from moving in the rotation direction by other mechanisms, such as a key groove, instead of the regulation surfaces $2d_1$. However, the regulation surfaces $2d_1$ can easily prevent the semi-floating metal bearings 17, 27, 37, and 47 from moving in the rotation direction.

The body $18a$ of the locking member 18 of the embodiment described above is not limited to the configuration including the body lower portion $18a_1$, the body side portions $18a_2$, and the projections $18a_3$. However, the locking member 18 provided with the body $18a$ having the configuration described above can easily be fixed to the outer circumferential groove $17g$.

The respective embodiments exemplified the case in which the body side portions $18a_2$, $28a_2$, $38a_2$, and $48a_2$ are pressed and spread out by elastic deformation, and the projections $18a_3$, $28a_3$, $38a_3$, and $48a_3$ return to come closer to the outer circumferential grooves $17g$, $27g$, $37g$, and $47g$ due to elastic force. The body side portions $18a_2$, $28a_2$, $38a_2$, and $48a_2$ may have any configuration as long as the locking members 18, 28, 38, and 48 can be fixed to the outer circumferential grooves $17g$, $27g$, $37g$, and $47g$. However, the elastic force of the body side portions $18a_2$, $28a_2$, $38a_2$, and $48a_2$ can fix the locking members 18, 28, 38, and 48 to the outer circumferential grooves $17g$, $27g$, $37q$, and $47g$ more easily and accurately. A gap may be provided between the outer circumferential grooves $17g$, $27g$, $37g$, and $47g$ and the body side portions $18a_2$, $28a_2$, $38a_2$, and $48a_2$, respectively, in the state in which the locking members 18, 28, 38, and 48 are fixed to the outer circumferential grooves $17g$, $27g$, $37g$, and $47g$.

The guide portions $17g_3$ formed on the outer circumferential groove $17g$ of the embodiment described above may be omitted. However, the guide portions $17g_3$ can reduce load acting on the body side portions $18a_2$ and spread out the projections $18a_3$ easily, so as to improve the operation performance when fixing the locking member 18.

The respective embodiments exemplified the case with reference to the drawing in which the end surface of the respective semi-floating metal bearings 17, 27, 37, and 47 is integrally provided with a thrust bearing. The thrust bearing may be provided separately from the respective semi-floating metal bearings 17, 27, 37, and 47.

While the embodiments have been described above with reference to the appended drawings, it should be understood that the present disclosure is not intended to be limited to the descriptions thereof. Various alternatives or modifications may be made without departing from the scope of the following appended claims and will become apparent to those skilled in the art. The present disclosure is to cover all alternatives or modifications falling within the scope of the disclosure.

What is claimed is:

1. A bearing structure in which a semi-floating metal bearing having a cylindrical portion is housed in a bearing hole formed in a housing, and a shaft is rotatably supported by a bearing surface formed on an inner circumferential surface of the cylindrical portion, the bearing structure comprising:
    an outer circumferential groove formed on an outer circumferential surface of the cylindrical portion of the semi-floating metal bearing, and including two opposed surfaces opposed to each other in an axial direction of the shaft and a bottom surface connected to the two opposed surfaces;
    a radial hole penetrating, in a radial direction of the shaft, a wall portion defining the bearing hole of the housing so as to communicate with the bearing hole, and facing the outer circumferential groove of the semi-floating metal bearing housed in the bearing hole;
    a locking member having a body inserted into the radial hole from an outer side in the radial direction of the shaft, wherein at least part of the body is interposed between the two opposed surfaces and fixed to the outer circumferential groove; and
    an opposed portion provided in the housing including the bearing hole, and opposed to the part of the body of the locking member in the axial direction of the shaft when the locking member is fixed to the outer circumferential groove,
    wherein the body includes:
    a body lower portion located toward the radial hole and opposed to the shaft when the locking member is fixed to the outer circumferential groove;
    a pair of body side portions extending forward from the body lower portion in an insertion direction in which the body is inserted into the radial hole, and separated from each other in a plane direction orthogonal to the axial direction of the shaft and a direction orthogonal to the insertion direction; and
    projections projecting from the body side portions in a direction in which the body side portions come closer to each other, and fitted to the outer circumferential groove ahead of the shaft in the insertion direction.

2. The bearing structure according to claim 1, wherein the part of the body is located in the radial hole when the locking member is fixed to the outer circumferential groove, and a wall surface defining the radial hole in the housing serves as the opposed portion.

3. The bearing structure according to claim 2, wherein the radial hole is provided with a regulation surface normal to the axial direction of the shaft and opposed to the locking member, so that a rotation of the semi-floating metal bearing is prevented by the bottom surface of the outer circumferential groove, the locking member, and the regulation surface of the radial hole when the semi-floating metal bearing oscillates in a rotation direction of the shaft.

4. The bearing structure according to claim 3, wherein the bottom surface of the outer circumferential groove has a polygonal cross section normal to the axial direction of the shaft.

5. The bearing structure according to claim 1, wherein the radial hole is provided with a regulation surface normal to the axial direction of the shaft and opposed to the locking member, so that a rotation of the semi-floating metal bearing is prevented by the bottom surface of the outer circumferential groove, the locking member, and the regulation surface of the radial hole when the semi-floating metal bearing oscillates in a rotation direction of the shaft.

6. The bearing structure according to claim 5, wherein the bottom surface of the outer circumferential groove has a polygonal cross section normal to the axial direction of the shaft.

7. The bearing structure according to claim 1, wherein, in a fixing of the locking member to the outer circumferential groove, the projections are pressed and spread out by the bottom surface of the outer circumferential groove in a separating direction in which the projections move away from each other, fitted to the outer circumferential groove while the body side portions are elastically deformed, and come closer to each other due to elastic force of the body side portions when the projections reach ahead of the shaft in the insertion direction.

8. The bearing structure according to claim 7, wherein the bottom surface of the outer circumferential groove includes guide portions facing the radial hole and inclined so as to spread out the respective projections in the separating direction when the projections come in contact with the guide portions in the process of fixing the locking member to the outer circumferential groove.

9. A turbocharger comprising the bearing structure according to claim 1.

* * * * *